Dec. 2, 1930.  J. O. GOULD  1,783,876
RAIL NUT LOCK
Filed July 17, 1929
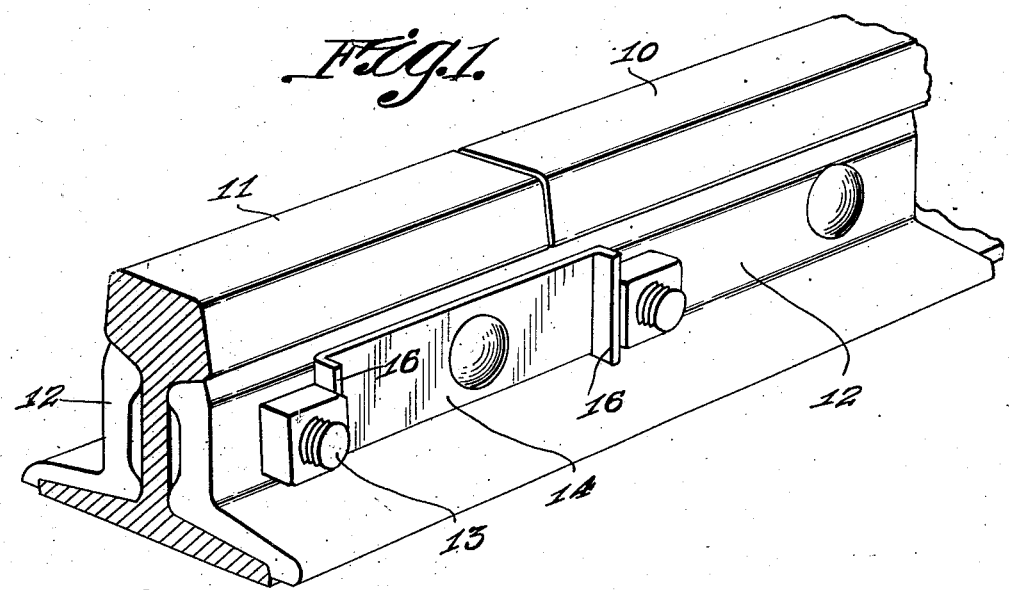
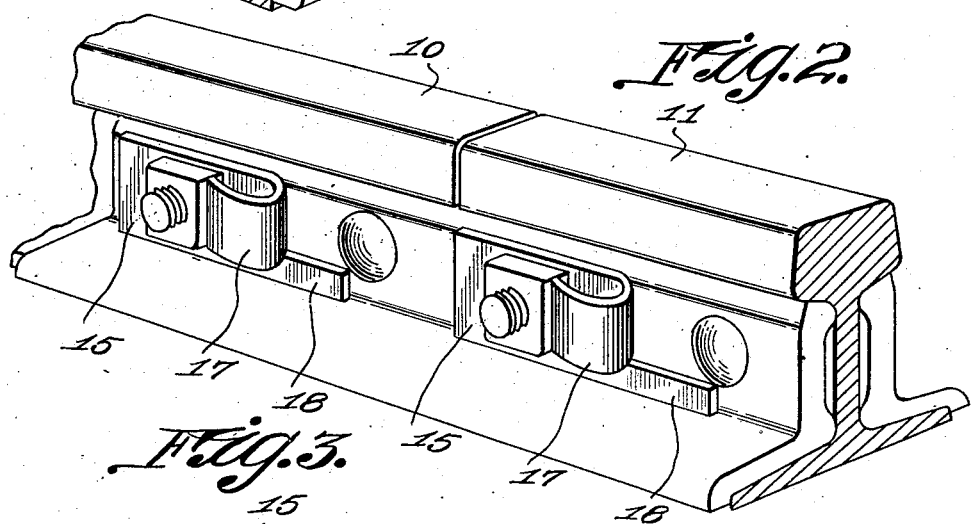
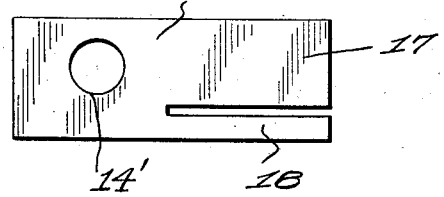
INVENTOR.
J. O. Gould,
BY
Victor J. Evans
ATTORNEY.

Patented Dec. 2, 1930

1,783,876

UNITED STATES PATENT OFFICE

JAMES O. GOULD, OF SUMMERVILLE, PENNSYLVANIA

RAIL NUT LOCK

Application filed July 17, 1929. Serial No. 379,001.

This invention relates to certain new and useful improvements in nut locks primarily designed for application upon and for use in conjunction with rails and fish plates therefor.

An object of the invention comprehends the provision and arrangement of means whereby the nuts will be lockingly retained against displacement upon both sides of the joint.

Another object of the invention contemplates the provision of plate members to be carried upon the bolts.

More specifically stated the plate members are provided with nut engaging portions.

With the above and other objects in view, the invention further consists of the following novel features and details of construction to be hereinafter more fully described, illustrated in the accompanying drawing and pointed out in the appended claims.

In the drawing:—

Figure 1 is a perspective view of the completed rail joint illustrating the arrangement of a portion of my nut lock.

Figure 2 is a view similar to Figure 1 illustrative of the opposed side of the rail joint and the complemental locking structure.

Figure 3 is a plan view of one of the complemental locking devices in blank form.

Referring to the drawing in detail wherein like characters of reference denote corresponding parts, the reference characters 10 and 11 indicate the adjacent ends of companion rails having fish plates 12 arranged thereon across the joint. Bolt members 13 passed through the fish plates and the webs of the rails are also passed through the plate 14 and the eccentrically located openings 14' in the plate 15 in accordance with the suggested arrangement disclosed in Figures 1 and 2 of the drawing. Two bolts are arranged upon each of the rails but only one bolt passes through the plate 14 as shown in Figure 1.

The ends of the latter mentioned plate are right-angularly bent to provide abutments or nut engaging portions 16. Said plate engages and retains two nuts against displacement. The bolts extending in oppositely disposed relation to that of the bolts carrying the locked nuts are in turn, projected through the opening 14' in the opposed fish plate, as shown in Figure 2. The plate members 15 are initially accommodated upon the projecting tapped extremities of the bolts to provide spacing washers therefor. The abutments or nut engaging portions for the plates 15, and as indicated at 17, are reversely bent in the manner shown leaving fins or projections 18 incident to the particular formation thereof. These fins or projections lie flush against the points of intersection of the adjacent fish plates between the rail web and foot engaging portions. The arrangement disclosed will lock all the nuts upon the bolts employed at each rail joint whereby road gangs employed for the sole purpose of tightening joints will be obviated in view of the fact that the initial installation or application is all that is required to establish a tight joint and does not require periodic inspection and tightening.

The invention is susceptible of various changes in its form, proportions and minor details of construction, and the right is herein reserved to make such changes as properly fall within the scope of the appended claims.

Having thus described the invention, what is claimed is:—

1. A nut lock comprising an elongated plate having an eccentrically located bolt receiving opening, a bolt passed through the opening and accommodating a nut, said plate having a slot opening to the opposite end and to one side of the longitudinal center thereof, the wider portion being reversely bent upon the plate to dispose the extremity thereof in abutting engagement with the immediate portion of the nut, and the narrower portion being projected outwardly in alignment with the plane of the plate and in opposed relation to that of the wider portion.

2. In combination, a rail joint including plates connecting the ends of adjacent rail sections, of a plurality of bolts extending through the rail sections and plates, a locking plate bearing against the connecting plate on one side of the joint, said locking plate being held in position by one of the bolts, angular extremities for said locking plate engaging the inner faces of adjacent nuts to hold said nuts against rotation, and a final locking plate carried by the mentioned bolt and bearing against the connecting plate upon the other side of the joint and engaging the nut of said mentioned bolt to hold the nut against rotation.

3. In combination, a rail joint including plates connecting the ends of adjacent rail sections, of a plurality of bolts extending through the rail sections and plates, a locking plate bearing against the connecting plate on one side of the joint, said locking plate being held in position by one of the bolts, angular extremities for said locking plate engaging the inner faces of adjacent nuts to hold the bolts therefor against rotation, a final locking plate carried by the mentioned bolt and bearing against the immediate connecting plate upon the opposite side of the joint, the latter mentioned locking plate being split, and a portion of the final locking plate to one side of the split being reversely bent upon the plate to dispose the extremity thereof in abutting engagement with the immediate face of the nut upon the mentioned bolt to hold the latter against rotation.

In testimony whereof I affix my signature.

JAMES O. GOULD.